United States Patent
Francis

[15] 3,700,184
[45] Oct. 24, 1972

[54] SEAT BELT RETRACTION DISABLING DEVICE

[72] Inventor: Reid Eugene Francis, Detroit, Mich.

[73] Assignee: Ford Motor Company, Dearborn, Mich.

[22] Filed: Feb. 8, 1971

[21] Appl. No.: 113,228

[52] U.S. Cl. ................................. 242/107.4
[51] Int. Cl. ............................... A62b 35/00
[58] Field of Search .......... 242/107 SB, 107.4, 107.5, 107.6, 242/107.7; 280/150 SB; 297/388

[56] References Cited

UNITED STATES PATENTS

| | | | |
|---|---|---|---|
| 3,180,456 | 4/1965 | Whittingham | 242/107.4 X |
| 3,240,510 | 3/1966 | Spouge | 280/150 |
| 3,598,336 | 8/1971 | Frost | 242/107.4 |

Primary Examiner—Werner H. Schroeder
Attorney—John R. Faulkner and William E. Johnson

[57] ABSTRACT

A device is described for disabling the retraction of an automatically retracted seat belt. The retraction device has a shaft, about which the seat belt is wound, which has gear teeth formed on an exposed free end thereof. The disabling device includes a position locating mechanism which is driven to various positions by the shaft's gear teeth as the seat belt is unwound from the shaft. A locking device is engageable with the position locating mechanism in order to lock the mechanism and the belt shaft in a fixed position associated with the extension of a predetermined belt length. A cam controlled device is also provided which controls whether the locking device operates to lock the position locating mechanism in the fixed position. Operating mechanism is also provided which operates in conjunction with the cam controlled device to selectively actuate the same thereby to control the movement of the locking device into and out of locking engagement with the position locating mechanism.

6 Claims, 7 Drawing Figures

INVENTOR
REID E. FRANCIS
BY John R. Faulkner
William E. Johnson
ATTORNEYS

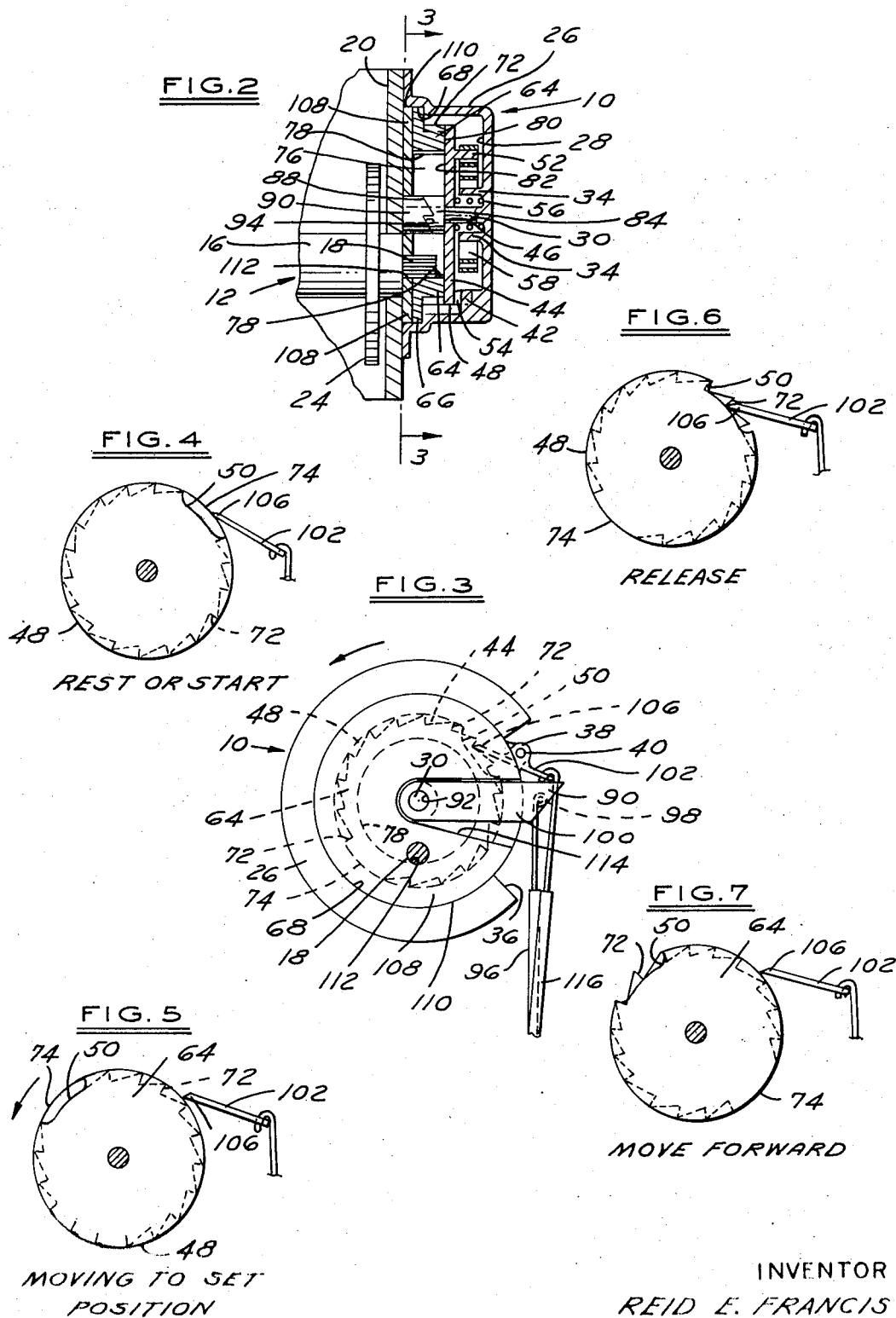

SEAT BELT RETRACTION DISABLING DEVICE

BACKGROUND OF THE INVENTION

All motor vehicles presently produced for general use contain seat belts for restraint purposes. Many of the vehicles also contain shoulder belts for restraint purposes. Depending on the number of passengers that the vehicle may carry, the front seat of the vehicle may have as many as 10 belts lying about. In an endeavor to make the vehicle's interior more pleasing, automatic seat belt retraction devices are provided for retracting the unused belts to a stored position. In the stored position, the free end of the belt is exposed and the remainder thereof generally is wound about a shaft of the retraction device.

A particular type of seat belt retraction device already known in the prior art is a device which permits extension of a retracted seat belt by slowly pulling the belt out of the device against a spring force. This type of device is the so-called inertial device. In general, with this type of device, any attempt to rapidly extend the belt from the device causes a mechanism of the device to lock upon the belt and anchor the belt firmly within the device.

This inertial type of seat belt retraction device permits an occupant of the motor vehicle some freedom in movement even though he has placed the belt about a portion of his body. More particularly, since the device permits a slow extension of the belt, the occupant although belted, may move forward slowly and the retraction device will permit further extension of the belt to allow such movement. However, when the passenger moves forward rapidly, as for example, during a rapid deceleration of the motor vehicle, the inertia device locks and does not permit further extension of the belt thereby restraining the occupant.

One difficulty is found with the utilization of the above discussed type of automatic seat belt retraction device as well as many other of the known automatic seat belt retraction devices. This difficulty is that when the belt is unwound from such a device a pulling force is applied to the belt at all times for returning the belt to its fully retracted position. When an occupant of a vehicle unwinds a seat belt from such a retraction device and secures it about his body, the retraction device applies a constant pulling force on the belt which is transferred to the occupant's body. The pulling force sometimes causes discomfort to the occupant.

SUMMARY OF THE INVENTION

This invention relates to a device for disabling the retraction of an automatically retracted seat belt, and more particularly, to a device for disabling the retraction of an automatically retracted seat belt in which the automatic retraction device includes a shaft about which the seat belt is wound. One of the principle purposes of the device of this invention is to eliminate the constant pulling force applied to the occupant of a motor vehicle who wears a seat belt which is associated with such a retraction device. By eliminating such a constant pulling force, the discomfort of the occupant wearing a belt is substantially reduced.

In accordance with the general teachings of this invention, the device for disabling the retraction of an automatically retracted seat belt by an automatic retraction device includes a shaft about which a seat belt is wound. Gear teeth are formed on an exposed, free end of the seat belt shaft. A position locating mechanism is provided which includes a plurality of gear teeth cooperable with the gear teeth of the seat belt shaft. This locating mechanism is driven by the gear teeth to various positions in response to rotation of the belt shaft upon extension of the seat belt from the retraction device. The locating mechanism also has a ratchet structure formed thereon. A yocking device is provided which is engageable with the ratchet structure of the locating mechanism for locking the locating mechanism in a selected position indicative of the extension of a selected amount of the seat belt. When the locating mechanism is locked in a selected position, the gear teeth thereon cooperate with the gear teeth of the belt shaft to restrict movement of the belt shaft which would tend to return the extended seat belt to its retracted position. When the locking device locks the locating mechanism, the portion of the belt extending from the retraction device does not have any pulling force thereon and will not apply any pulling force to a vehicle occupant about whom the belt is positioned.

The disabling device of this invention also includes a cam device. This cam device keeps the locking device out of engagement with the ratchet structure of the position locating mechanism when in a first condition with respect to the locking device. The cam device also permits the locking device to engage the ratchet structure of the locating mechanism when in a second condition with respect to the locking device. The cam device is in its second condition with respect to the locking device only when the cam device is in an initial position which it also assumes when the seat belt is fully retracted within the seat belt retracting device.

Mounting structure is provided for mounting the cam device and the position locating mechanism for movement either with one another as a unit or relative to one another. As such, the cam device may be moved from its initial position upon initial movement of the position locating mechanism. However, the mounting structure permits the cam device to be returned to its initial position or second condition even though the position locating mechanism is not returned to its initial position. When the cam device is in its second condition with respect to the locking device, the locking device functions to lock the locating mechanism in a particular position.

An operating mechanism is provided for selectively permitting either unit movement or relative movement of the cam device and the position locating mechanism to accomplish the function of permitting the locking device to lock the locating mechanism as described above. A housing structure is provided for mounting all of the various elements of the retraction disabling device of this invention to the seat belt retractor device.

Thus, the device of this invention permits one to extend a selected length of seat belt from an automatic retraction device and then lock that extended portion in its extended position. When so locked, the retraction device does not apply a pulling force to the belt which may be transmitted to the body of the seat belt wearer. Such an elimination of the application of a pulling force to the body of the vehicle occupant reduces possible discomfort to the occupant.

BRIEF DESCRIPTION OF THE DRAWINGS

FIG. 2 is an elevation view, in cross section, showing the device of FIG. 1 in a functional relationship with the seat belt retraction device shown in FIG. 1.

FIG. 3 is a front elevation view taken along line 3—3 of FIG. 2 showing further details of the device of this invention.

FIGS. 4 through 7 are schematic views of portions of the retraction disabling device of this invention in various positions assumed during different operational stages of the device.

DESCRIPTION OF THE PREFERRED EMBODIMENT

CONSTRUCTION

Figure 1:
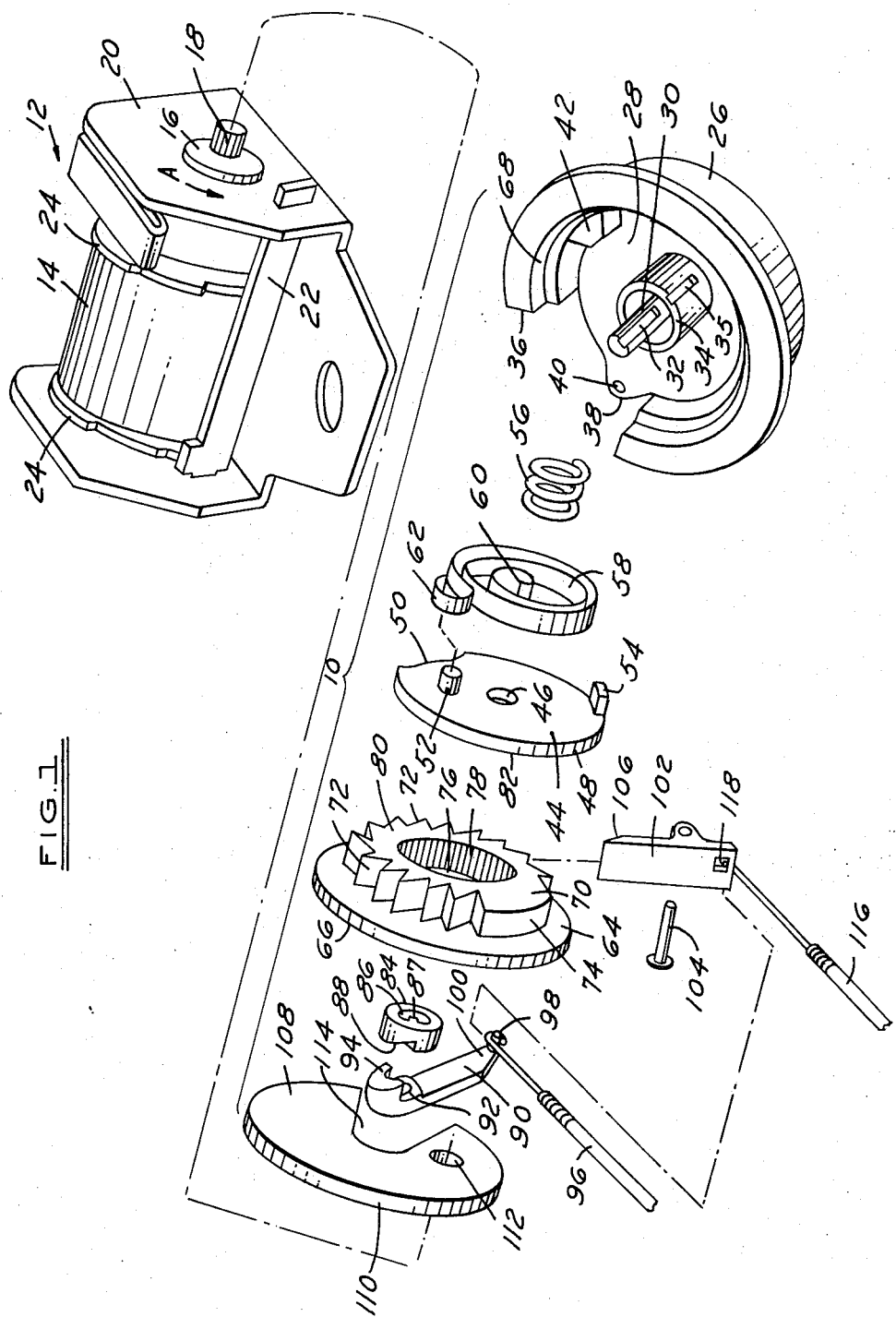
FIG. 1 is an exploded, perspective view of various disassembled elements of the device for disabling the retraction of an automatically retracted seat belt formed in accordance with the teachings of this invention. The device is shown in conjunction with an automatic seat belt retraction device of known construction.

Reference is now made to FIG. 1 which shows a device for disabling the retraction of a seat belt formed in accordance with the teachings of this invention and generally identified by the numeral 10. The disabling device is used in conjunction with an automatic seat belt retraction device generally identified by the numeral 12. The seat belt retraction device includes a belt 14 which is wrapped about a seat belt retraction shaft 16 in such a manner that the belt may be withdrawn from the device in a direction to the upper right corner of FIG. 1. The shaft has a set of gear teeth 18 formed on a portion thereof which projects through an end plate 20 of the retraction device.

The seat belt retraction device 12 is of standard design known in the art and may be of such type that the seat belt 14 may be withdrawn from the device at a low rate of speed without any difficulty. However, when an attempt is made to withdraw the belt rapidly, a member 22 is moved into engagement with ratchet teeth 24 on opposite sides of the belt 14 to limit further withdrawal of the belt. Since the seat belt retraction device may take any one of the many different forms which are already well known in the art, no further description thereof will be contained herein.

Reference is now made to the disabling device 10 and the component parts thereof which are best seen in the exploded, perspective view of FIG. 1. The assembled condition of the device is illustrated in FIGS. 2 and 3. The device 10 has a cap 26. The cap has a base 28 from which projects a central hub 30 which has an axial slot 32 therein. The cap also has a receiving lip 34 encircling the central hub and an axial slot 35 formed in the lip. An opening 36 is provided in the cap. The cap also has a boss 38 formed thereon which has an opening 40 therethrough. A stop 42 is formed in the cap to extend upwardly from the cap's base.

A cam 44 is provided which has a central opening 46 therethrough. The opening allows the cam to be received on the central hub 30 of the cap 26 for rotatable movement thereon. The cam has a circumferential cam surface 48 with a cam slot 50 formed therein. The cam also has a projecting post 52 and a stop lug 54. The stop lug engages the stop 42 of the cap in order to limit the relative movement of the cam on the central hub.

A coil spring 56 has one end for reception in the opening between the receiving lip 34 and the central hub 30 of the cap 26. The other end of the coil spring applies an axial biasing force against the cam 44 as may best be understood by viewing FIG. 2.

A spiral spring 58 has one end 60 thereof turned in for reception in the axial slot 35 of the lip 34 of the cap 26. The other end 62 of the spring is curled about so that the projecting post 52 of the cam 44 may be received therein. In use, when the cam is rotated on the central hub 30 of the cap, a biasing pressure is provided by the spiral spring 58 on the cam which tends to return the cam to its normal position wherein its stop lug 54 is in engagement with the stop 42 of the cap.

A gear element 64 has a first annular flange 66 thereon. This annular flange is received in and rotatable about a receiving lip 68 formed in the cap 26. The gear element has a second annular flange 70 of smaller circumference than the first annular flange 66. The second flange has a plurality of ratchet teeth 72 formed thereon as well as a smooth surface 74.

The gear element 64 also has an enlarged central opening 76 therethrough. A plurality of gear teeth 78 are formed on the internal diameter of the enlarged central opening. These gear teeth are mateable with the gear teeth 18 formed on the exposed end of the shaft 16 of the seat belt retracting device 12. The ratio of these gear teeth is so selected that the gear element is not driver more than one revolution upon full extension of the belt 14. A friction surface 80 is provided on the surface of the gear element which faces and engages the cam 44. Similarly, a friction surface 82 is provided on the surface of the cam element 44 which faces and engages the friction surface 80 of the gear element 64. The friction surfaces may be formed by roughing the surfaces in question.

A displaceable member 84 has a central opening 86 therethrough. A projection 87 is formed into the central opening 86 and is receivable by the axial slot 32 formed on the central hub 30 of the cap 26 in order to permit axial but non-rotatable movement of the member 84 on the central hub. As seen best in FIG. 2, in an assembled condition, one end of the displaceable member 84 is in engagement with the friction surface 82 of the cam 44. The other end of the displaceable member is formed as a cam surface 88.

A displacing member 90 also has a central opening 92 therein so that it may be rotatably mounted on the central hub 30 of the cap 26. The displacing member has a cam drive surface 94 thereon which is operatively associated with the cam surface 88 of the displaceable member 84. The operating member 90 is actuated through the utilization of a wire 96 which is secured over a post 98 of an operating lever portion 100 of the displacing member 90.

A locking pawl 102 is secured by means of a pin 104 to the opening 40 of the boss 38 of the cap 26. A free end 106 of the locking pawl is thereby located adjacent the second annular flange 70 of the gear element 64 and the circumferential cam surface 48 and cam slot 50 on the cam 44.

An attaching plate 108 is provided. This plate has an annular flange 110 which is received in the receiving lip 68 of the cap 26 in order to secure all of the structure into an integral unit to form the disabling device 10 of this invention. The attaching plate 108 also has an opening 112 therein which permits the gear teeth 18 of the shaft 16 of the seat belt retracting device 12 to pass therethrough when the device is secured to the retraction device. The attaching plate also has an enlarged opening 114 in which the displacing member 90 and its operating lever portion 100 are operable between non-actuated and actuated positions.

A wire 116 is shown as being received in an opening 118 of the locking pawl 102. The purpose of this wire is for pivoting the locking pawl from an actuated position to a non-actuated position about the pin 104 in order to release the mechanism as will be described below.

OPERATION

When the seat belt 14 is fully retracted into the automatic seat belt retracting device 12 and the disabling device 10 of this invention is in an inoperative condition, all of the various elements of the device are in the normal positions illustrated in FIGS. 2 and 4 of the drawings. The disabling device 10 is secured to the end plate 20 of the seat belt retracting device 12 by any suitable means such as by clips or screws (not shown).

In the normal position, the coil spring 56 acts upon the cam 44 so that its friction surface 82 is engaging the friction surface 80 of the gear element 64. The friction surface 82 of the cam 44 also acts upon the displaceable member 84 to apply a biasing force thereagainst. Application of the biasing force to the displaceable member 84 causes the cam surface 88 thereof to act upon the cam drive surface 94 of the displacing member 90 to position it as illustrated in FIG. 2. Similarly, in the normal position, the spiral spring 58 acts upon the cam 44 so as to bring the stop lug 54 of the cam into engagement with the uppermost side of the stop 42 of the cap 26 as illustrated in FIG. 1.

With reference to FIG. 4, some of the elements of the device 10 are illustrated in the normal position. More particularly, as shown therein, the free end 106 of the locking pawl 102 is shown as riding on the smooth surface 74 of the gear element 64. The circumferential cam surface 48 of the cam 44 is also illustrated at the normal position. In this normal position, the cam slot 50 thereof is shown as being adjacent the free end of the locking pawl. This is the second condition of the cam 44 with its slot 50 aligned with the free end of the locking pawl. When the seat belt 14 is extended from the seat belt retracting device 12, the shaft 16 is rotated in the direction of arrow A of FIG. 1. This action causes similar rotation of the gear element 64 through its gear teeth 78. Since the friction surfaces 80 and 82, respectively, formed on the gear element 64 and the cam 44, are in contact with one another, the cam is also rotated simultaneously with the gear element. During its rotation and at its new position, the cam is in its first condition because its cam slot 50 is not aligned with the free end of the pawl. As is best seen in FIG. 5, during the rotation of the shaft 16 upon extension of the seat belt 14, the free end 106 of the locking pawl 102 rides along the circumferential cam surface 48 of the cam 44.

When the seat belt has been extended far enough to be locked about the vehicle occupant, the disabling device 10 of this invention may be actuated to relieve the pressure from the retraction device 12 on the belt 14 by pulling on wire 96 attached to the operating lever portion 100 of the displacing member 90. Such operation causes the displacing member to be moved in the opening 114 to its operated position. This movement of the operating lever causes the cam drive surface 94 thereon to operate against the cam surface 88 of the displaceable member 84 whereby the last mentioned member is displaced to the right as viewed in FIG. 3. Such movement of the displaceable member causes the friction surfaces 80 and 82, respectively, formed on the gear element 64 and the cam 44, to be separated whereby the two no longer move in conjunction with one another. Once sufficient separation has been accomplished, the spiral spring 58 which has been wound by rotation of the cam 44 acts on the projecting post 52 of the cam to return the cam to its initial position wherein the stop lug 54 comes into engagement with the stop 42 of the cap 26.

The return of the cam 44 to its initial position once again causes the cam to be in its second condition with the cam slot 50 aligned with the free end 106 of the locking pawl 102. The free end of the pawl then comes into engagement with one of the ratchet teeth 72 of the gear element 64 to hold the gear element in a fixed position. It should be noted that rotation of the gear element 64 away from the normal position causes the smooth surface portion 74 thereof to be moved away from the free end of the locking pawl thus allowing the ratchet teeth to be engaged. Once the device of this invention has achieved the position shown in FIG. 6, the gear teeth 78 of the gear element 64 act upon the gear teeth 18 of the seat belt shaft 16 to retain the shaft in its displaced position whereby no tension is applied to the portion of the seat belt 14 which has been extended from the seat belt retracting device 12.

After the device has achieved the condition shown in FIG. 6, the occupant of the vehicle who is wearing the belt may still move forward at a slow speed. More particularly, after the cam 44 has returned to its initial position wherein the cam slot 50 thereof is aligned with the free end 106 of the locking pawl 102, the displaceable member 84 returns to its original position when pressure is relieved on the wire 96. The friction surfaces 80 and 82, respectively, formed on the gear element 64 and the cam 44, are once again moved back into engagement with one another. Upon further extension of the belt 14, the gear element 64 is once again displaced through the action of the gear teeth 18 and 78. This displacement of the gear element also causes a new displacement of the cam 44 as is shown in FIG. 7. Displacement of the cam causes the free end 106 of the locking pawl 102 to be pivoted out of engagement with the particular one of the ratchet teeth 72 which it had previously engaged. However, when the passenger moves back to the original position, the gear element 64 and the cam 44 return to the position shown in FIG. 6 wherein the free end of the locking pawl again comes into contact with the ratchet teeth to lock the same so that no tension is in the belt. FIG. 4.

In order to return the disabling device 10 of this invention and the seat belt retracting device 12 to their initial or normal positions, wires 96 and 116 are both operated. The operation of the wire 116 pivots the free end 106 of the locking pawl 102 out of contact with any engaged ratchet teeth. Operation of the wire 96, as previously described, causes the separation of the friction surfaces on the gear element 64 and the cam 44 whereby the cam is returned to its initial position. Since the locking pawl is not engaging the ratchet teeth of the gear element, the retractor mechanism of the seat belt retracting device 12 is effective to withdraw the belt into the retractor device. The retraction of the belt operates through shaft 16 and gears 18 and 78 to return the gear element 64 to the position shown in FIG. $.

Modifications of the device of this invention will be apparent to those skilled in the art in view of this specification. It is intended that all variations and modifications of the device of this invention which will fall within the true spirit and scope of the invention be included within the appended claims.

What I claim is:

1. A device for disabling the retraction of an automatically retracted seat belt, the automatic retraction device including a shaft about which a seat belt is wound and gear teeth formed on an exposed, free end of the shaft, which disabling device comprises:
   position locating means including a plurality of gear teeth cooperable with the gear teeth of the belt shaft, said means for being driven through said gear teeth to a selected position in response to rotation of the belt shaft upon extension of the seat belt, said position locating means also having ratchet means thereon;
   a locking means engageable with said ratchet means of said position locating means for locking said position locating means in a selected position;
   cam means both for keeping said locking means out of engagement with said ratchet means when said cam means is in a first condition with respect to said locking means and for permitting said locking means to engage said ratchet means when said cam means is in a second condition with respect to said locking means, said cam means being in its second condition with respect to said locking means only when said cam means is in an initial position;
   mounting means for mounting said cam means and position locating means for movement either with one another as a unit or relative to one another whereby said cam means may be moved from its initial position upon movement of said locating means but may be returned to its initial position even though said locating means is not returned to its initial position;
   operating means for selectively permitting either unit movement or selective movement of said cam means and said locating means; and
   housing means for mounting said position locating means, said locking means, said cam means, said mounting means and said operating means in association with one another adjacent the automatic retraction device with said gear teeth of said position locating means engaging the gear teeth of the shaft about which the seat belt strap is wound.

2. The device of claim 1 wherein: said locking means is a pivotable pawl mounted at a fixed position with respect to said housing means; wherein said ratchet means of said locating means is a set of ratchet teeth; and wherein a free end of said pawl is movable into engagement with said ratchet teeth when said cam means is in its second condition with respect to said locking means to lock said position locating means in a selected position.

3. The device of claim 2 wherein: said ratchet teeth of said locating means are formed about a major portion of an exterior, circumferential surface formed on said locating means, a portion of said circumferential surface not having ratchet teeth thereon initially being located adjacent said free end of said locking pawl when the seat belt is in a fully retracted position; and wherein said cam means include a circumferential cam surface adjacent said ratchet teeth of said locating means, said cam surface having a cam slot therein, which cam slot in said initial position of said cam means is adjacent said free end of said locking pawl.

4. The device of claim 3 wherein: said mounting means includes both structure means formed on said housing means for supporting adjacent one another along their entire circumferential extent said portion of said locating means having said ratchet teeth thereon and said circumferential surface of said cam means, said mounting means further including facing surfaces on each of said two last mentioned means which are so formed that they are friction surfaces which will drive one another when in contact.

5. The device of claim 4 wherein: said operating means includes spring means for biasing said friction surface of said cam means into engagement with said friction surface of said locating means, and wherein said operating means also includes displacing means for separating said friction surfaces of said locating means and said cam means from contact with one another against the bias of said spring means.

6. A device for disabling the retraction of an automatically retracted seat belt, the automatic retraction device including a shaft about which the seat belt is wound and gear teeth formed on a free end of the shaft, which disabling device comprises:
   a cap having a base from which projects a central hub, said hub having an axial slot therein and an annular recess thereabout, said cap also having a stop member located on the base thereof, said cap also having a receiving lip encircling said hub;
   a cam having a central opening therethrough received on said hub of said cap, said cam having a circumferential cam surface with a cam slot formed therein along a portion of said circumferential surface, said cam also having a projecting post and a stop lug thereon extending toward said base of said cap, said stop lug being engageable with said stop member of said cap for limit in relative rotative movement of said cam with respect to said cap;
   a coil spring received at one end in said annular recess of said cap and having the other end thereof engaging said cam to bias said cam in a direction away from said base of said cap along the axis of said central hub;
   a spiral spring having the interior end thereof secured to said cap, the exterior end of said spring being formed about said projecting post of said cam to bias said cam to a normal circumferential position on said hub wherein said stop lug of said cam is in engagement with said stop member of said cap;
   a gear element having a first annular flange received and movable within said receiving lip of said cap for rotation relative thereto, said gear element also having a second annular flange of smaller circumference than said first flange, said second flange having a plurality of ratchet teeth formed thereon and a smooth surface thereon, said gear element further having an enlarged central opening through said first and said second flanges, said enlarged central opening having a plurality of gear teeth formed on the internal diameter thereof, said teeth being matable with the gear teeth formed on the free end of the shaft of the retractable seat belt device, said gear element and said cam having mutually facing surfaces for forming friction surfaces so that said two elements rotate as a unit when said surfaces are in contact with one another;

a displaceable member having central opening formed for reception on said hub of said cap and having a projection in said opening for reception in said slot of said hub to locate said member in a fixed angular attitude on said hub, said member extending through said enlarged opening of said gear element to engage the surface of said cam which, in part, frictionally engages said gear element, said displaceable element having a cam surface on the end thereof not engaging said surface of said cam;

a displacing member having an opening therein for reception on said hub of said cap, said displacing member also having a cam drive surface thereon associatable with said cam surface of said displaceable member, said member further having an operating lever which, when moved from a first position to a second position, causes said cam drive surface to move said cam surface of said displaceable member whereby said displaceable member is moved axially along said hub of said cap thereby to move said cam also axially along said hub to compress said coil spring and to permit said mutual friction surfaces of said gear element and said cam to disengage whereby said cam is rotated to its normal position by the biasing action of said spiral spring;

a locking pawl pivotably mounted with a free end in juxtaposition to the perimeter of both said second flange of said gear element and said cam, said free end of said pawl being movable into locking engagement with one of said ratchet teeth on said gear element when said cam is in its normal position with its cam slot aligned with said free end of said pawl, a first operating wire for moving said operating lever of said displacing member; and a second operating wire for pivoting said locking pawl.

* * * * *